United States Patent
Suzuki et al.

(10) Patent No.: US 7,583,877 B2
(45) Date of Patent: Sep. 1, 2009

(54) OPTICAL FIBER, OPTICAL FIBER CONNECTION STRUCTURE AND OPTICAL CONNECTOR

(75) Inventors: Kanako Suzuki, Hitachi (JP); Bing Yao, Hitachi (JP); Kazumasa Ohsono, Hitachi (JP); Yoshihisa Kato, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/068,083

(22) Filed: Feb. 1, 2008

(65) Prior Publication Data

US 2008/0292248 A1 Nov. 27, 2008

(30) Foreign Application Priority Data

May 22, 2007 (JP) ............................. 2007-135406

(51) Int. Cl.
*G02B 6/02* (2006.01)

(52) U.S. Cl. ........................ 385/123; 382/124; 382/125

(58) Field of Classification Search .......... 385/123–125
See application file for complete search history.

(56) References Cited

U.S. PATENT DOCUMENTS

| 6,661,954 B2 * | 12/2003 | Sasaoka et al. ............... 385/39 |
| 6,868,213 B2 | 3/2005 | Sasaoka et al. |
| 7,242,835 B2 * | 7/2007 | Busse et al. ................ 385/125 |
| 7,376,315 B2 * | 5/2008 | Kurosawa et al. ........... 385/123 |

FOREIGN PATENT DOCUMENTS

| JP | 2002-236234 | 8/2002 |
| JP | 2002-323625 | 11/2002 |

* cited by examiner

*Primary Examiner*—Ellen Kim
(74) *Attorney, Agent, or Firm*—McGinn IP Law Group, PLLC

(57) ABSTRACT

An optical fiber includes a core, a clad having a plurality of air holes at a periphery of the core, and a hardening resin filled in a sealed portion at an end of the plurality of air holes. The hardening resin after hardening has a fill length of 7 mm to 8 mm. An optical fiber connection structure includes the optical fiber with an end face butt-connected to another optical fiber. An optical connector includes the optical fiber, and a ferrule to which the optical fiber is attached.

8 Claims, 6 Drawing Sheets

| 15 HARDENING RESIN | 21 FERRULE |
| 16 SEALED PORTION | 22 FIXING PORTION |
| 18 REFRACTIVE INDEX MATCHING AGENT | 23 FIBER HOLDNG PORTION |
| | 93 END FACE |

OPTICAL FIBER, OPTICAL FIBER CONNECTION STRUCTURE AND OPTICAL CONNECTOR

The present application is based on Japanese patent application No. 2007-135406 filed on May 22, 2007, the entire contents of which are incorporated herein by reference.

BACKGROUND OF THE INVENTION

1. Field of the Invention

The invention relates to an optical fiber with air holes extending along a longitudinal direction thereof and, in particular, to an optical fiber with the air holes sealed with a hardened resin at an end face thereof. The invention also relates to a connection structure using the optical fiber where the optical fiber is connected to another optical fiber, and an optical connector using the optical fiber.

2. Description of the Related Art

Along with the speeding up in optical communication networks and optical signal processing, higher-capacity optical fibers are desired. A spotlighted technique therefor is a photonic crystal fiber (hereinafter referred to as "PCF") with air holes formed extending along a longitudinal direction thereof.

Figure 7:
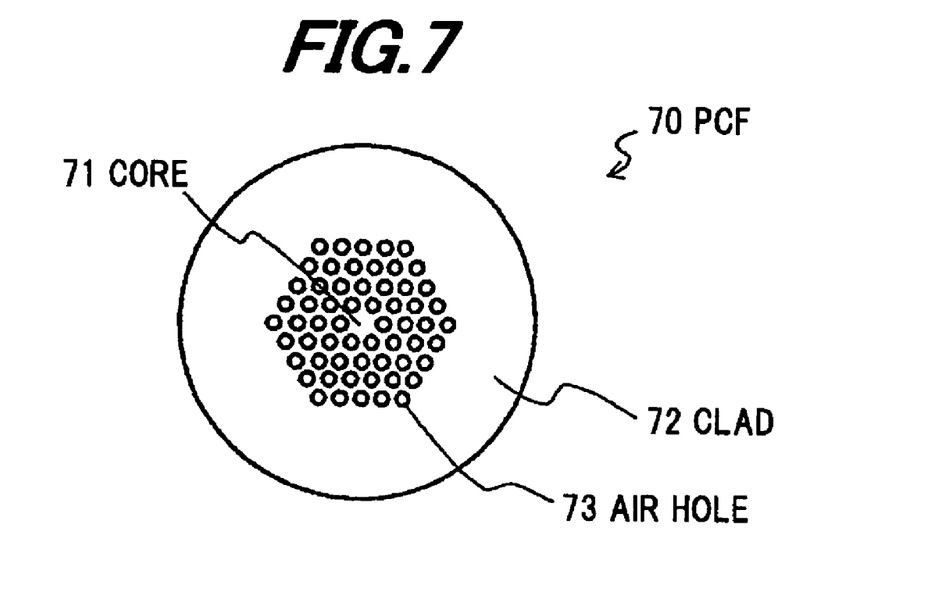
FIG. 7 is a cross sectional view showing a photonic crystal fiber.

As shown in FIG. 7, plural air holes 73 are formed in a clad 72 surrounding a core 71 of a PCF 70. By conditioning the design (number, shape, size, configuration and the like) of the air holes 73, various properties such as ultrawideband single-mode transmission region, large effective core section area, High-Δ, and large waveguide dispersion can be realized.

Figure 8:
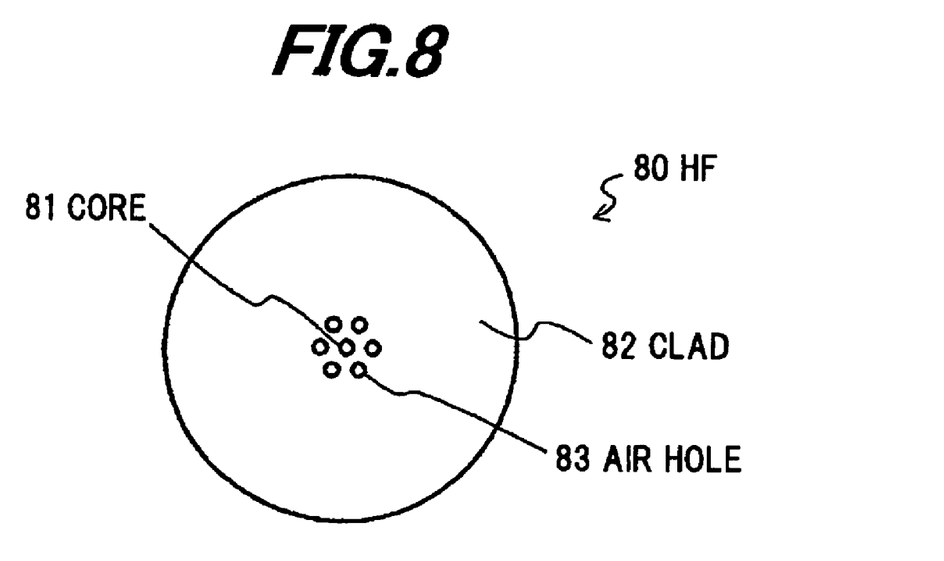
FIG. 8 is a cross sectional view showing a holey fiber.

As shown in FIG. 8, a holey fiber (hereinafter referred to as "HF") 80 which is an example of total-reflection PCFs has plural (six in FIG. 8) air holes 83 formed in a clad 82 surrounding a core 81 with Ge added thereinto, whereby the effective refractive index of the clad 82 is reduced. Since the air holes 83 with a refractive index of substantially 1 are formed in the clad 82, the effective relative refractive index difference of the core 81 to the clad 82 can be increased by about 32% as compared to a general-purpose single mode fiber (hereinafter referred to as "SMF").

Figure 9:
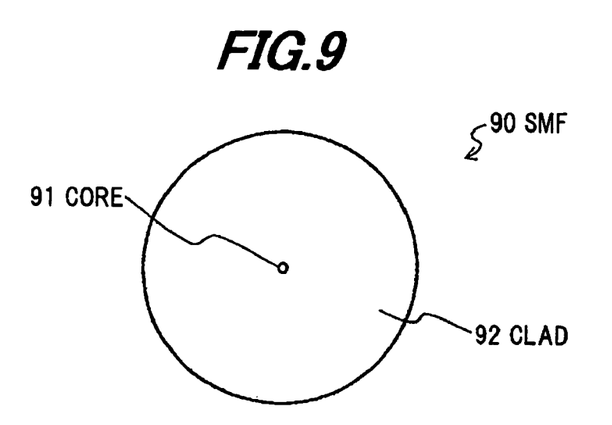
FIG. 9 is a cross sectional view showing a general-purpose single-mode fiber.

As shown in FIG. 9, a general-purpose SMF 90 is composed of a core 91 with a diameter small enough to satisfy single mode condition, and a clad 92 covering the core 91. Consequently, the HF 80 has the properties that the light confining effect of the core 81 can be higher than that of the general-purpose SMF 90 and the bend loss when bending the optical fiber can be reduced significantly. It is expected that, by using the properties as above, the HF is used practically as an indoor wiring optical fiber which requires necessarily being bent in wiring.

On the other hand, a conventional method for connecting optical fibers includes butt connection by mechanical splice and connector connection.

Figure 10:
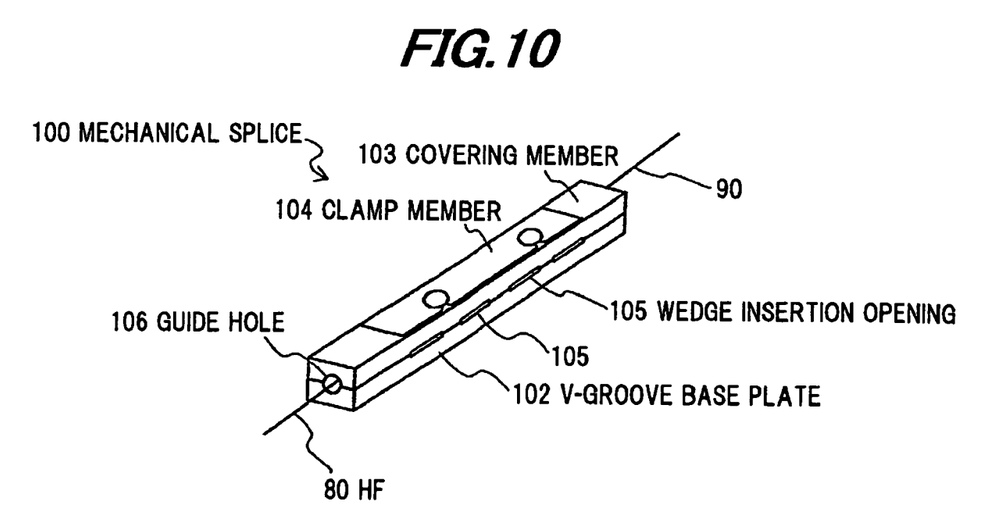
FIG. 10 is a schematic perspective view showing a mechanical splice.

The butt connection is conducted by using a mechanical splice 100 as shown in FIG. 10. The mechanical splice 100 is composed of a V-groove base plate 102 with a V-groove for supporting PCF 70 or the HF 80 and the SMF 90 where they are butted each other at respective opposed end faces and for positioning and aligning them, a covering member 103 placed on the V-groove base plate 102 to hold the PCF 70 or HF 80 and the SMF 90 inserted in the V-groove, and a clamp member 104 for clamping the V-grooved base plate 102 and the covering member 103. Between the V-groove base plate 102 and the covering member 103, wedge insertion openings 105 are formed on the side face of the mechanical splice 100. Guide holes 106 for inserting the PCF 70 or HF 80 and the SMF 90 are formed on both ends of the mechanical splice 100.

In connecting the PCF 70 or HF 80 with the SMF 90 by the mechanical splice 100, wedges (not shown) are inserted in the wedge insertion openings 105 to make a gap between the V-groove base plate 102 and the covering member 103, the PCF 70 or HF 80 and the SMF 90 are inserted through the guide hole 106 into the V-groove, the end face of the PCF 70 or HF 80 is butted to the end face of the SMF 90, and the wedges are removed to clamp the PCF 70 or HF 80 and the SMF 90 by the base plate 102 and the covering member 103.

In case of the butt connection, if an air layer is generated between the butted end faces of the PCF 70 or HF 80 and the SMF 90, Fresnel reflection on the butted end faces of the optical fibers becomes considerable. For this reason, a refractive index matching agent is previously filled in the V-groove to reduce the difference between the relative refractive indexes of the PCF 70 or HF 80 and the SMF 90. The refractive index matching agent has the same refractive index as the core of the butted PCF 70 or HF 80 and the SNF 90.

The connector connection is conducted such that optical fiber connectors with a ferrule attached to each end of optical fibers are mechanically butted each other.

Figure 11:
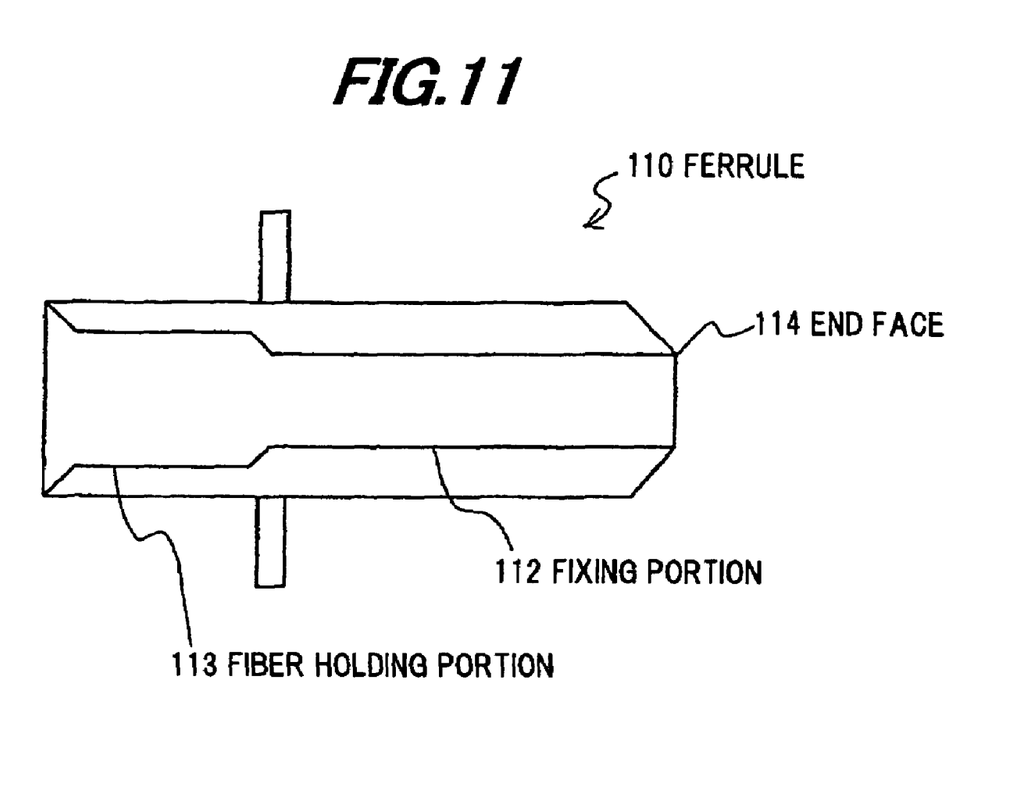
FIG. 11 is a longitudinal sectional view showing a ferrule used for an optical connector.

As shown in FIG. 11, a ferrule 110 as a member constituting an optical fiber connector is composed of a fixing portion 112 for fixing an optical fiber bare wire with its covering removed, and a fiber holding portion 113 for holding a fiber core wire with the covering. In case of using the optical fiber connector as a single core optical connector, the ferrule 110 is cylindrical shaped. The optical fiber is fixed in the ferrule 110 with an adhesive such as a thermosetting resin, and the end face of the optical fiber and the ferrule end face 114 are polished. In general optical connectors, the end faces are polished into a spherical shape to prevent Fresnel reflection on the fiber end faces.

When connecting the PCF 70, HF 80 etc. having the air holes by the above connection methods, the following problems will arise.

In case of the butt connection by the mechanical splice 100, the refractive index matching agent filled between the PCF 70 or HFC 80 and the SMC 90 may penetrate into the air hole based on capillary phenomenon. When the refractive index matching agent with the same refractive index as that of the core penetrates into the air hole, it should be taken that a core is formed in the air hole. Therefore, light will couple with the core formed in the air hole to increase the connection loss.

In case of the connector connection, polish chips generated when polishing the end face of the optical fiber and the ferrule end face 114 may be entered in the air hole. In this case, if the connector is attached/detached repeatedly, the polish chips entered in the air hole may be exposed on the end face of the optical fiber to cause fracture or crack on the end face of the optical fiber when attaching the connector, so that the long-term reliability of the optical fiber lowers.

In order to solve these problems, a matching oil, a UV-ray setting resin or a thermosetting resin is filled in the air holes to seal the end face of the optical fiber (See JP-A-2002-236234 and JP-A-2002-323625).

The sealing of air holes at the end face of the PCF 70 or the HF 80 is conducted such that a hardening resin is filled in the air holes, and the hardening resin in the air holes is cured by ultraviolet radiation or heat. Hardening resins used generally therefor have the same refractive index as or a lower refractive index than the clad of an optical fiber.

However, the refractive index of the hardening resins exhibits temperature dependency, where the refractive index increases according as temperature lowers. As a result, a problem may arise that, at low-temperature side, the refractive index of air hole (filled with the resin) comes close to that of the core so that light is mode-coupled with the resin-filled air hole while being diverged from the core, whereby the connection loss increases.

SUMMARY OF THE INVENTION

Accordingly, it is an object of the invention to provide an optical fiber that can prevent the increase in connection loss even when the refractive index of a hardening resin varies due to change in working environmental temperature. Also, it is another object of the invention to provide an optical fiber connection structure and an optical connector for the optical fiber.

According to one embodiment of the invention, an optical fiber comprises:

a core;

a clad comprising a plurality of air holes at a periphery of the core; and a hardening resin filled in a sealed portion at an end of the plurality of air holes, wherein the hardening resin after hardening comprises a fill length of 7 mm to 8 mm.

According to another embodiment of the invention, an optical fiber connection structure comprises:

an end face of the optical fiber as defined above being butt-connected to another optical fiber.

According to another embodiment of the invention, an optical connector comprises:

the optical fiber as defined above; and a ferrule to which the optical fiber is attached.

BRIEF DESCRIPTION OF THE DRAWINGS

The invention will be explained in more detail in conjunction with appended drawings, wherein.

DESCRIPTION OF THE PREFERRED EMBODIMENTS

Preferred embodiments of the invention will be described below referring to the accompanying drawings.

Figure 1:
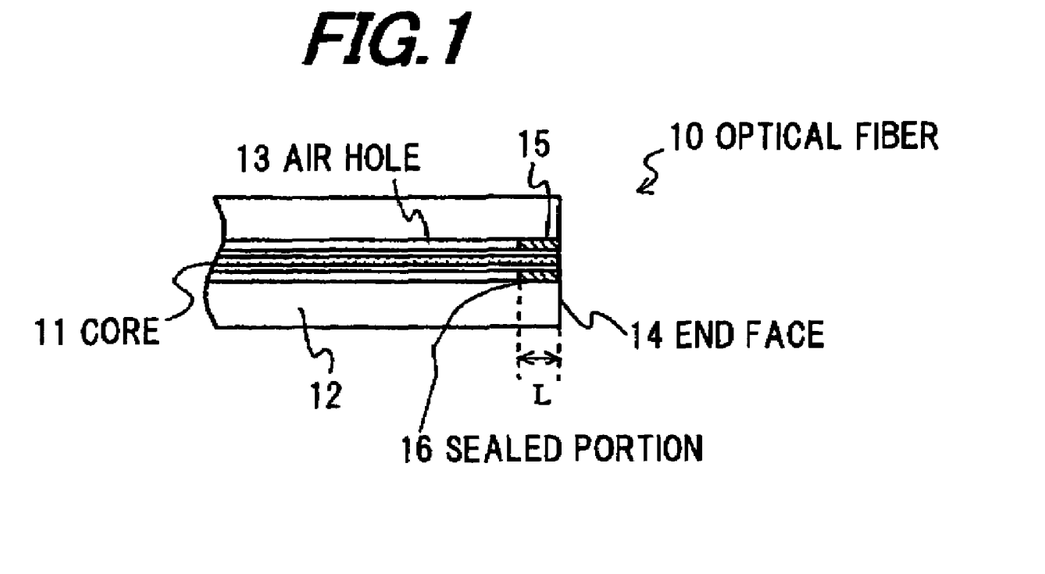
FIG. 1 is a longitudinal sectional view showing an optical fiber in a preferred exemplary embodiment of the invention.
Figure 2:
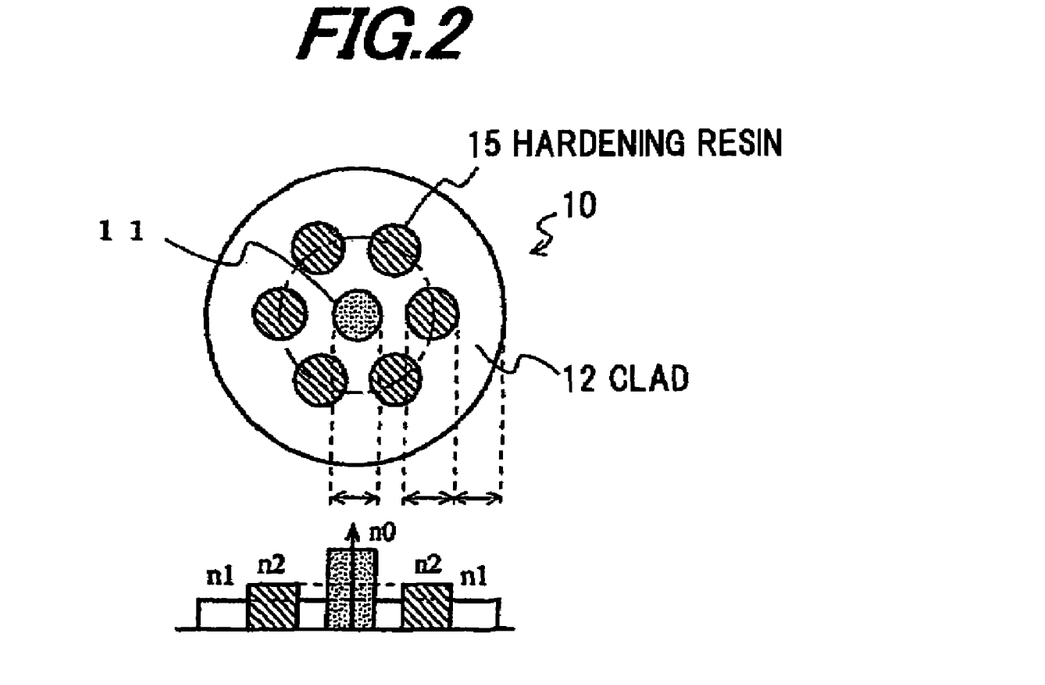
FIG. 2 is an enlarged cross sectional view showing a central part of the optical fiber, where a hardening resin is filled and cured in air holes, as well as a refractive index distribution diagram.

FIG. 1 is a longitudinal sectional view showing an optical fiber in the preferred exemplary embodiment of the invention. FIG. 2 is an enlarged cross sectional view showing a central part of the optical fiber, where a hardening resin is filled and cured in air holes, as well as a refractive index distribution diagram.

As shown in FIGS. 1 and 2, an optical fiber 10 in the exemplary embodiment is a holey fiber that is composed of a core 11 made of silica glass with germanium (Ge) added thereto, and a clad 12 made of pure silica glass and having plural air holes 13 surrounding the core 11, where an end of the air holes 13 is filled with a hardening resin 15, and the resin is hardened to have a sealed portion 16. In this case, a fill length L of the hardening resin 15 after the hardening, which forms the sealed portion 16, is 7 to 8 mm.

Since the core 11 and the clad 12 are made of silica glass, the refractive index n0 of the core 11 and the refractive index n1 of the clad 12 scarcely change with temperature. On the other hand, the refractive index of the hardening resin 15 filled in the air holes 13 changes with temperature. Therefore, the refractive index n2 of the air holes 13 with the hardening resin 15 filled therein (sealed portion 16) changes also with temperature.

In the optical fiber 10, the relationship between the no of the core 11 and the refractive index n1 of the clad 12 is n0>n1. The refractive index n2 of the sealed portion 16 with the hardening resin 15 is preferably always lower than the refractive index n0 of the core 11, i.e. n0>n2. This is because when the refractive index n2 of the sealed portion 16 comes close to the refractive index n0 of the core 11, light is mode-coupled with the sealed portion 16 while being diverged from the core 11, whereby the connection loss increases.

Although the refractive index n2 of the sealed portion 16 is preferably lower than the refractive index n1 of the clad 12, the refractive index n2 of the sealed portion 16 may be larger than the refractive index n1 of the clad 12 when the working environment changes. In this regard, even when the relative refractive-index difference between the refractive index n2 of the sealed portion 16 and the refractive index n1 of the clad 12 changes in the range of 0.4% or less, variation in optical power can be suppressed so far as the fill length L of the hardening resin 15 after the hardening is set 7 to 8 mm, whereby the mode-coupling of light from the core 11 can be reduced.

The hardening resin 15 filled in the air holes 13 may be a UV-ray setting resin, a cold-setting resin, or a thermosetting resin, and the UV-ray setting resin is preferably used in view of workability.

Examples of the UV-ray setting resin include epoxy base, urethane base, silicone base, fluorine base UV-ray setting resins and the like. Examples of the cold-setting resin include silicone base, acrylic base cold-setting resins. Examples of the thermosetting resin include epoxy base, silicone base, and fluorine base thermosetting resins. The hardening resin to be used in the invention is not particularly limited thereto.

Although the material of the hardening resin 15 is not particularly limited, it preferably has a lower refractive index than that of the core 11, a moisture permeability after the hardening of not more than 0.5 g/cm$^2$·24 h, a glass adhesion force of not less than 5 MPa, a hardness in Shore D scale (Shore D hardness) of not less than 50, a volume shrinking percentage of not more than 5%, and a viscosity before the hardening of not more than 5 Pa·s.

If the moisture permeability exceeds 0.5 g/cm²·24 h, dew condensation will arise easily in the air holes 13 under the environment at high humidity, where the connection loss may increase. The moisture permeability is preferably not more than 0.3 g/cm²·24 h.

The moisture permeability is obtained conforming to the JISZ0208 moisture permeability test method (cup method) for moisture-proof packaging materials, where a sample with a thickness of 50±5 μm is used, and the test is conducted under Condition B: at temperature of 40±5° C. and humidity of 90±2%.

If the hardening resin 15 has a glass adhesion force (adhesive strength to glass) of less than 5 MPa, when hardened in the air holes 13, a gap between the hardening resin 15 and the glass interface is likely to occur due to the volume shrinkage etc. of the hardening resin 15 so that the sealed portion 16 may be detached by vibration when polishing the end face 14. Even when the glass adhesion force is not less than 5 MPa, if the hardness of the hardening resin 15 after the hardening is smaller than 50 in Shore D, the sealed portion 16 is easily scraped away by the vibration when polishing the end faces 14, so that the resin surface can be recessed and the recessed part can be clogged with polishing agent or polish chips, whereby the reliability of connector connection is remarkably reduced.

The term "glass adhesion force" means a tensile shear adhesive strength that corresponds to a destructive force required in case that surfaces with 10 mm one-side length of two slide glasses (which are 25 mm in width, 75 mm in length and 1 mm in thickness) are bonded through a hardening resin, the resin is cured, and the bonded two slide glasses are pulled away from each other at a rate of 10 mm/min in opposite directions.

If the volume shrinking percentage of the hardening resin 15 exceeds 5%, when the resin 15 is hardened in the air holes 13, a gap between the filled hardening resin 15 and the air hole 13 is likely to occur, where the hardening resin 15 can be detached easily. If the hardening resin 15 before the hardening has a viscosity of more than 5 Pa·s at 25° C., the workability will lower when filling the hardening resin 15 in the air holes 13, and the resin is difficult to fill uniformly into the plural air holes 13. The viscosity is preferably 0.1 to 3 Pa·s. If the viscosity is less than 0.1 Pa·s, the capillary phenomenon is accelerated, whereby the fill length L is difficult to keep constant.

A connection structure for the optical fiber 10 as constructed above will be described below.

Figure 3:
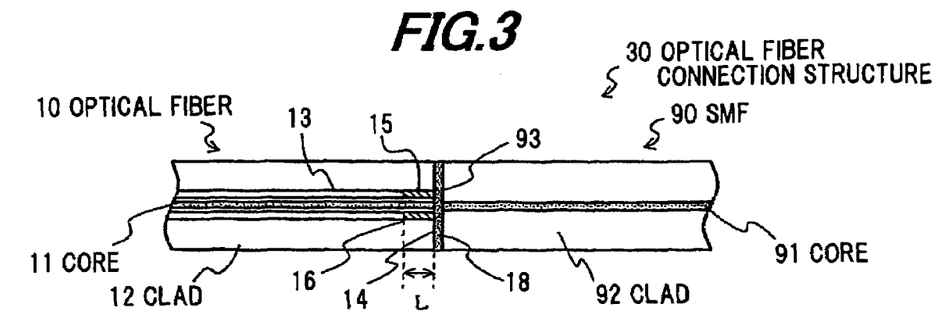
FIG. 3 is a longitudinal sectional view showing a connection structure for optical fibers in the exemplary embodiment.

As shown in FIG. 3, a connection structure 30 for optical fibers is made by butt-connecting the end face 93 of the SMF 90 to the end face 14 of the optical fiber 10 through a refractive index matching agent 18.

If an air layer exists between the end faces of the optical fiber 10 and the SMF 90 being butt-connected, the connection loss increases. In addition, connection loss also occurs due to the difference in refractive index between the core 11 of the optical fiber 10 and the core 91 of the SMF 90. Therefore, the refractive index matching agent 18 is filled between the end faces of the optical fiber 10 and the SMF 90 to reduce the difference in refractive index therebetween. The refractive index matching agent is to have the same refractive index as that of the cores of the optical fiber 10 and the SMF 90 being butt-connected.

The optical fiber to be connected to the optical fiber 10 is not limited to the SMF 90, and a general-purpose multimode fiber such as a GI fiber or a SI fiber may be used alternatively.

Although the connection structure 30 is made such that another optical fiber is connected to the optical fiber 10 through the refractive index matching agent 18, the invention is not limited thereto, the another optical fiber may be directly connected to the optical fiber 10 without the refractive index matching agent 18.

An optical connector using the optical fiber 10 will be described below.

Figure 4:
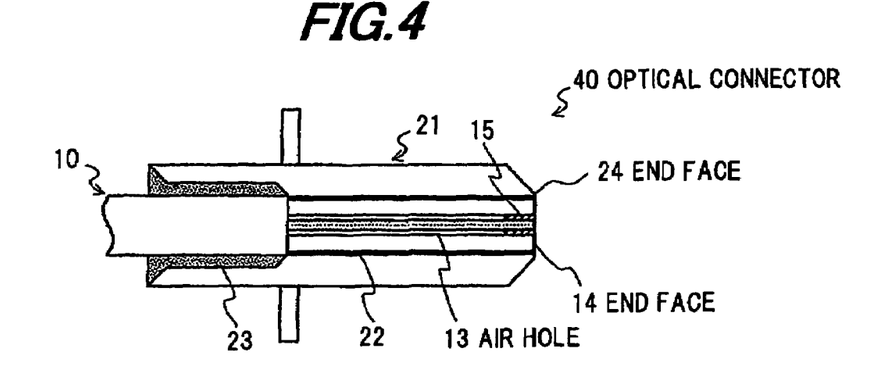
FIG. 4 is a longitudinal sectional view showing an optical connector for optical fibers in the exemplary embodiment.

As shown in FIG. 4, the optical connector 40 is an SC optical connector that the optical fiber 10 is attached to a ferrule 21. The ferrule 21 is composed of a fixing portion 22 for fixing the bare wire of the optical fiber 10 without a covering, and a fiber holding portion 23 for holding the optical fiber 10 with the covering. The eptical fiber 10 is inserted into the ferrule 21 and fixed with an adhesive such as a thermosetting resin. The end face 14 of the optical fiber 10 and the end face 24 of the ferrule 21 are polished.

Although the optical connector 40 of the embodiment is exemplified as the CS optical connector as shown in FIG. 4, the invention is not limited thereto and a housing for FC may be attached to the ferrule 21 to form an FC connector. Furthermore, a ferrule for FC or MU connector may be used to form a FC or MU connector.

The functions and effects by the optical fiber 10 in the exemplary embodiment will be described below.

Figure 5:
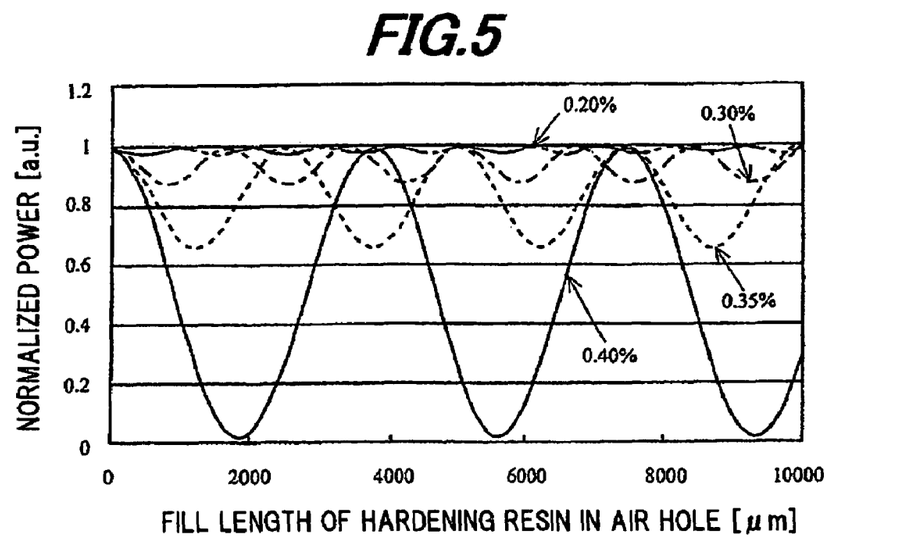
FIG. 5 is a diagram showing a variation in optical power to a fill length of a hardening resin when the relative refractive-index difference of the hardening resin changes.

As detailed later in Examples, it is found that, from the experimental results of the optical power variation to the fill length L of the hardening resin 15 as shown in FIG. 5, the connection loss increases according as temperature lowers, where the relative refractive-index difference between the sealed portion 16 and the clad 12 increases and the variation in optical power of the optical fiber increases. The increase of the connection loss is assumed to be due to the mode-coupling of light.

In order to reduce the loss due to the mode-coupling of light, it is optimal that the fill length L of the hardening resin 15 is set to be 7 to 8 mm where the variation of the optical power can be reduced most effectively. If the fill length L of the hardening resin 15 is 10 mm or more, the manufacturing efficiency will deteriorate.

The optical fiber 10 of the exemplary embodiment is constructed such that, after the hardening, the fill length L of the hardening resin 15 filled in the end of the air hole 13 of the optical fiber 10 is set to be 7 to 8 mm where the variation of the optical power can be reduced most effectively. Therefore, in the optical fiber 10, even when the refractive index n2 of the sealed portion 16 changes in the range that it is smaller than the refractive index n0 of the core 11 along with the temperature change due to the working environment, the mode-coupling of light can be reduced whereby the connection loss can be reduced.

By using the optical fiber 10, as shown in FIG. 3, the optical fiber connection structure 30 including, e.g., HF and SMF may be easily obtained.

Likewise, by using the optical fiber 10, as shown in FIG. 4, the optical connector 40 using HF can be easily obtained which is convenient for attachment/detachment.

Although the embodiment is exemplified to use a holey fiber as the optical fiber 10, the invention is not limited thereto. For example, PCF 70 shown in FIG. 7 may be used.

EXAMPLES

In the optical fiber 10 as shown in FIG. 1, the variation of optical power to the fill length L of the hardening resin 15 is examined by using a holey fiber. The details of the holey fiber are such that the diameter of the core 11 made of a silica material with germanium added is 9 μm, the distance from the center of the fiber to the center of the air hole 13 is 12 μm, the diameter of the air hole 13 is 8.5 μm, and the relative refractive-index difference of the core 11 is 0.4%.

FIG. 5 shows the variation of optical power to the fill length L of the hardening resin 15 when the relative refractive-index difference of the sealed portion 16 is set 0.2%, 0.3%, 0.35%, and 0.4%, respectively.

Herein, the relative refractive-index difference of the core 11 means the relative refractive index difference, which is represented by $(n_0-n_1)/n_0$, between the refractive index $n0$ of the core 11 and the refractive index $n1$ of the clad 12 made of a silica material. The relative refractive-index difference of the sealed portion 16 means the relative refractive index difference, which is represented by $(n_2-n_1)/n_2$, between the refractive index $n2$ of the air hole 13 (i.e., sealed portion 16) with the hardening resin 15 filled therein and the refractive index $n1$ of the clad 12.

As shown in FIG. 5, the optical power varies periodically depending on the variation of the fill length L of the hardening resin 15 filled in the air hole 13. It is found that according as the relative refractive-index difference of the hardening resin 15 filled in the air hole 13 increases, the variation of the optical power increases.

The refractive index of the hardening resin 15 for sealing the air hole 13 varies depending on temperature change in the working environment. For example, a case is examined that the relative refractive-index difference of the sealed portion 16 varies 0.2% to 0.4%. If the relative refractive-index difference of the sealed portion is 0.2%, even when the fill length L of the hardening resin 15 changes, the optical power varies very little and the connection loss is small. On the other hand, if the relative refractive-index difference of the sealed portion 16 is 0.4%, the optical power can lower by 90% or more depending on the fill length L of the hardening resin 15. If the relative refractive-index difference of the sealed portion 16 is less than 0.2%, the variation of the optical power becomes much smaller and the connection loss is almost eliminated.

The decrease of the optical power is assumed to be due to the mode-coupling of light from the core. The mode-coupling efficiency varies periodically depending on the variation of the fill length L of the hardening resin 15. Provided that the relative refractive-index difference of the sealed portion 16 varies in the range of not more than 0.4% due to the temperature change in the working environment, the fill length L is optimally 7 to 8 mm where the mode-coupling efficiency lowers in the above range.

As described above, if the fill length L of the hardening resin 15 filled in the air hole 13 is set 7 to 8 mm, when the optical fiber 10 is connected to the end face of the SMF 90 by using a mechanical splice or an optical connector, the mode-coupling of light occurs little even if ambient temperature changes (particularly, at such low temperature that the refractive index n2 of the sealed portion 16 comes close to the refractive index n0 of the core 11). Thus, the connection loss at the connection between the optical fiber 10 and the SMF 90 can be reduced.

Figure 6:
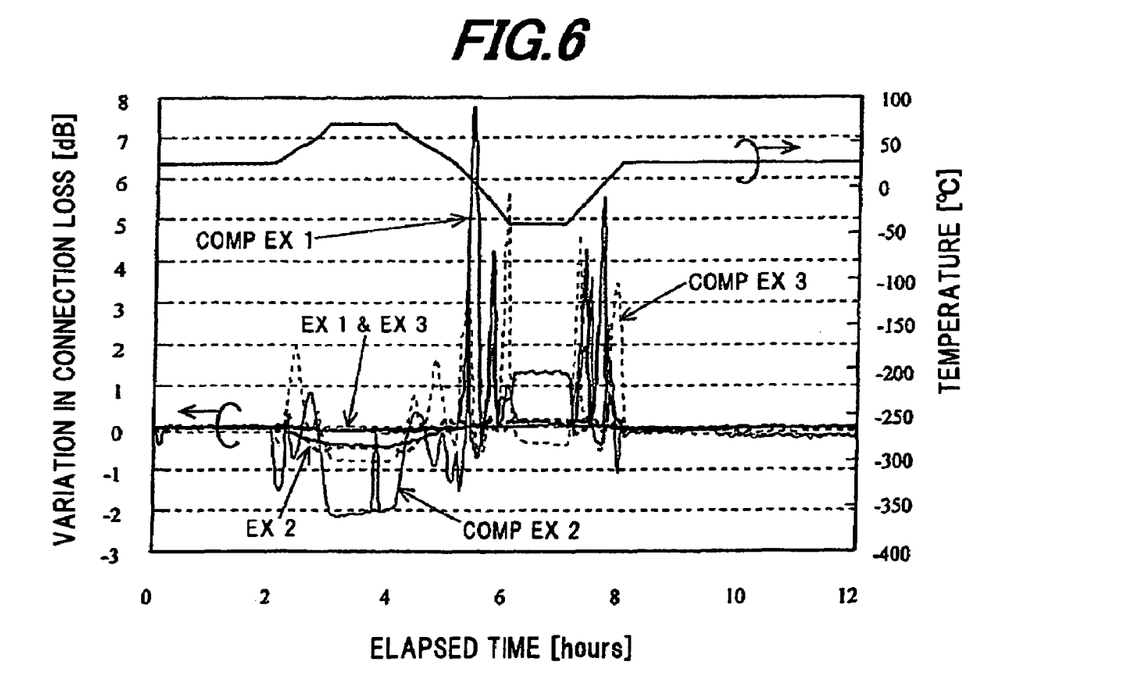
FIG. 6 is a diagram showing a change in connection loss when the optical fiber of the invention is connected to a regular SMF, and subjected to a temperature-humidity cycle test (−40° C. to 70° C./95% RH)

FIG. 6 is a diagram showing a change in connection loss when a temperature-humidity cycle test (−40° C. to 70° C./95% RH) is conducted after the preparation that the end of the air holes 13 of the optical fiber 10 as shown in FIG. 1 is sealed with the hardening resin 15 to form the sealed portion 16, the optical fiber 10 with an SC connector attached thereto is connected to a usual SMF 90 with a general-purpose SC connector attached thereto, and the connection part therebetween is placed in a temperature-controlled bath.

As the hardening resin 15, an epoxy base UV-ray setting resin ("UV-1000" manufactured by Daikin Industries, Ltd. Chemical Division) is used. This UV-ray setting resin is 250 mPa·s in viscosity, 0.2 $g/cm^2 \cdot 24$ h in moisture permeability, 1.449 (λ=1550 run) in refractive index, 4% in volume shrinking percentage, and 82 in hardness in Shore D (Shore D hardness).

In Examples 1 to 3 (abbreviated as EX 1 to EX 3 in FIG. 6), the fill length L of the hardening resin 15 filled in the end of the air holes 13 of the optical fiber 10 is 7.2 mm, 7.5 mm and 7.8 mm, respectively (See Table 1).

In Comparative Examples 1 and 2 (abbreviated as COMP EX 1 to COMP EX 2 in FIG. 6), the fill length L of the hardening resin 15 filled in the end of the air holes of the optical fiber is 2 mm and 5 mm, respectively (See Table 1). In Comparative Example 3 (abbreviated as COMP EX 3 in FIG. 6), no hardening resin 15 is filled in the air holes. It should be noted that the abovementioned fill length L of the hardening resin 15 filled in air holes means the length of the hardening resin 15 after the hardening.

TABLE 1

| | Example 1 | Example 2 | Example 3 | Comparative Example 1 | Comparative Example 2 | Comparative Example 3 |
|---|---|---|---|---|---|---|
| Fill Length L (mm) | 7.2 | 7.5 | 7.8 | 2 | 5 | 0 |

As shown in FIG. 6, the maximum variation of the connection loss during the temperature change from −40° C. to 70° C. in Examples 1 to 3 is 0.12 dB, 0.26 dB and 0.16 dB, respectively.

The small variation in connection loss in Examples 1 to 3 is assumed to be caused by reason that, since the fill length L of the hardening resin 15 in the air holes 13 is set 7 to 8 mm, the mode-coupling efficiency is low so as not to influence the connection loss even when the refractive index n2 changes due to the temperature change.

On the other hand, the maximum variation of the connection loss during the temperature change from −40° C. to 70° C. in Comparative Examples 1 to 3 is 7.8 dB, 3.6 dB and 5.8 dB, respectively.

In Comparative Examples 1 and 2, when the refractive index of the sealed portion 16 changes, the variation of the optical power increases and the connection loss increases temporarily. The increase of the connection loss is caused by the mode-coupling of light from the core 11 to the sealed portion 16, where the mode-coupling efficiency varies in magnitude depending on the difference in relative refractive-index. Thus, since the refractive index n2 changes according as temperature changes, the mode-coupling efficiency changes to cause the variation in connection loss. In comparative example 3, since the air holes are not sealed, the connection loss increases at low temperature region due to the influence of moisture permeated into the air holes 13.

Although the abovementioned optical fiber 10 is set 9 μm in diameter of the air hole, the invention is not limited thereto. The diameter of the air hole may be suitably changed in the range of 8.5 μm to 13 μm. Furthermore, although the relative refractive-index difference of the core 11 is set 0.4%, it may be changed in the range of 0.3 to 0.4% as long as the refractive index n2 of the sealed portion 16 is lower than the refractive index n0 of the core 11.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical fiber, comprising:
   a core;
   a clad comprising a plurality of air holes at a periphery of the core; and
   a hardening resin filled in a sealed portion at an end of the plurality of air holes,
   wherein the hardening resin after a hardening comprises a fill length in a range of 7 mm to 8 mm,
   wherein the core has a refractive index that is greater than a refractive index of the clad,
   wherein the sealed portion has a refractive index that is less than the refractive index of the core and greater than the refractive index of the clad, and
   wherein a relative refractive-index difference between the refractive index of the sealed portion and the refractive index of the clad is greater than zero and less than or equal to 0.4% in a temperature range of −40° C. to 70° C.

2. The optical fiber according to claim 1, wherein the hardening resin after the hardening comprises a moisture permeability of not more than 0.5 g/cm²·24 h.

3. The optical fiber according to claim 1, wherein the hardening resin after the hardening comprises an adhesive strength of not less than 5 MPa to glass, and
   wherein the hardening resin after the hardening comprises a hardness of not less than 50 in Shore D units of hardness.

4. The optical fiber according to claim 1, wherein the hardening resin comprises a volume shrinking percentage of not more than 5% by the hardening, and
   wherein the hardening resin before the hardening comprises a viscosity of not more than 5 Pa·s at 25° C.

5. The optical fiber according to claim 1, wherein the hardening resin comprises one of a UV-ray setting resin, a cold-setting resin, and a thermosetting resin.

6. An optical fiber connection structure, comprising:
   an end face of the optical fiber as defined by claim 1 being butt-connected to another optical fiber.

7. The connection structure according to claim 6, wherein the end face of the optical fiber is butt-connected to the another optical fiber through a refractive index matching agent.

8. An optical connector, comprising:
   the optical fiber as defined by claim 1; and
   a ferrule to which the optical fiber is attached.

* * * * *